United States Patent [19]

Katoh et al.

[11] Patent Number: 4,816,279
[45] Date of Patent: Mar. 28, 1989

[54] PROCESS FOR PRODUCING FISH-PASTE PRODUCTS

[75] Inventors: Noboru Katoh, Kawagoe; Shuzo Sakuma, Urawa; Shiego Sato, Funabashi; Sachio Wakayama, Tokyo; Hisashi Nozaki, Shiki, all of Japan

[73] Assignee: Kabushiki Kaisha Kibun, Chuo, Japan

[21] Appl. No.: 57,523

[22] PCT Filed: Sep. 26, 1986

[86] PCT No.: PCT/JP86/00494
§ 371 Date: Jul. 22, 1987
§ 102(e) Date: Jul. 22, 1987

[87] PCT Pub. No.: WO87/01911
PCT Pub. Date: Apr. 9, 1987

[30] Foreign Application Priority Data

Sep. 26, 1985 [JP] Japan .................................. 60-213075

[51] Int. Cl.⁴ .......................... A23L 1/325; A23P 1/00

[52] U.S. Cl. .................................... 426/513; 366/307;
426/519; 426/643

[58] Field of Search ............... 426/512, 513, 518, 643,
426/519; 99/348; 366/302, 303, 307

[56] References Cited

U.S. PATENT DOCUMENTS 4,494,356 1/1985 Takiguchi .......................... 426/518

FOREIGN PATENT DOCUMENTS 57-24105 5/1982 Japan .

Primary Examiner—George Yeung
Attorney, Agent, or Firm—Wegner & Bretschneider

[57] ABSTRACT

A process for producing a fish-paste product comprising continuously charging a starting material based on a minced fish flesh (surimi) into a stirring/mixing machine to shear the starting material, forming the minced flesh extruded from the stirring/mixing machine into a specific shape, and then heating the formed minced flesh. A fish-paste product having excellent gel strength can be produced by this process.

2 Claims, 2 Drawing Sheets

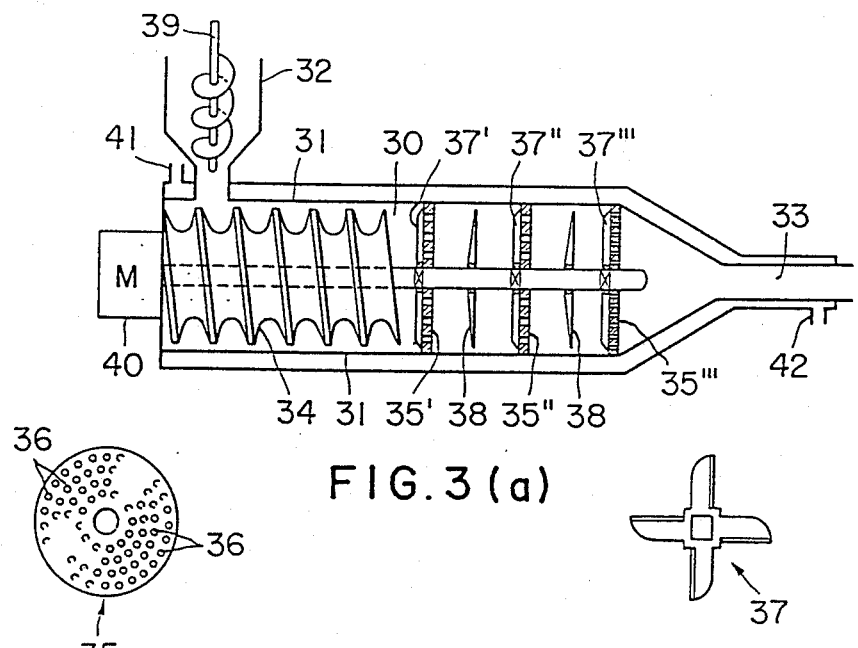
FIG. 3(a)
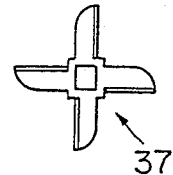
FIG. 3(c)
FIG. 3(b)
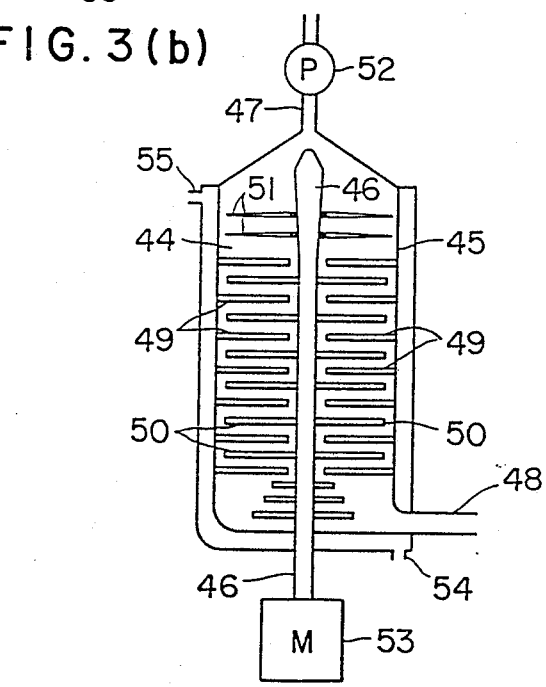
FIG. 4(b)
FIG. 4(a)

PROCESS FOR PRODUCING FISH-PASTE PRODUCTS

TECHNICAL FIELD

This invention relates to processes for producing fish-paste products. More particularly, it relates to a process wherein the denaturation of fish flesh during production is reduced, and wherein a fish-paste product having excellent gel strength can be produced.

BACKGROUND ART

Fish-paste products such as kamaboko (fish cakes), chikuwa (fish sticks), and agekamaboko (fried fish cakes) are generally produced by: grinding or mashing (stirring and mixing) raw materials, for example, fish flesh such as surimi or minced flesh (hereinafter referred to as surimi), seasonings, toughening agents such as starch, and water; forming the mixture into a suitable shape; and heating the molded material.

In this production process, elasticity specific to the fish-paste product is imparted in the following manner. When salt is added to fresh fish flesh surimi, and the mixture is ground, among the fish flesh proteins, salt-soluble proteins, particularly actomyosin, are eluted out to form a so-called sol, and thus surimi having very high tackiness is obtained. When this is heated, sol-like proteins are thermally coagulated into a gel having extremely great elasticity. This elasticity is a characteristic of the fish-paste product and is called "rubbery texture". It is said that the greater the elasticity is, the stronger is the rubbery texture. The rubbery texture occurs because actomyosins are bonded to each other upon heating to form a steric net structure.

Heretofore, in the grinding (stirring/mixing) step of a process for producing a fish-paste product, raw materials such as surimi, salt, and seasonings have been sequentially charged into a bath-type grinder (a stirring/mixing machine), a cutting mixer (Silent Cutter, trademark) or the like. The mixture has been stirred and mixed for a relatively long period of the time, and then salted surimi has been removed as a starting material for molding.

However, actomyosin eluted by salt addition is readily and rapidly denatured. The denaturation of actomyosin can occur even in the stirring step. In the case of long stirring, the ability of fish flesh to form a gel is not completely utilized. In the prior batch-type process, the salted surimi for molding tends to lag residually, and therefore in the material molded after a delay, "premature network formation" occurs. A product molded from the premature network-formed surimi exhibits remarkable reduction in gel. Thus, it is impossible to fully utilize the inherent ability of the raw material fish flesh to form a gel.

An object of the present invention is to provide a process by which the problems described above can be overcome and by which fish-paste products having "strong rubbery texture", i.e., excellent gel strength, can be produced.

DISCLOSURE OF INVENTION

We have carried out various experiments and studies with respect to the stirring/mixing step of the process for producing a fish-paste product. As a result, we have found that, if the raw materials are stirred and mixed for a short period of time using a continuous-type stirring/mixing machine, the object of the present invention can be effectively achieved. The present invention has been achieved on the basis of this discovery.

The process for producing a fish-paste product according to the present invention comprises stirring and mixing a surimi-based starting material by means of a stirring/mixing machine, forming the resulting surimi into a specific shape, and then heating the molded surimi and is characterized in that the starting material is continuously charged into the stirring/mixing machine, stirred and mixed so that shearing of the starting material occurs, and the sheared material is continuously extruded from the stirring/mixing machine.

In a preferred embodiment of the present invention, the starting materials are continuously charged into and extruded by a stirring/mixing machine comprising a drum having a plurality of outwardly directed projections on the outer periphery thereof and a coaxial cylinder which covers the outer periphery of the drum and its projections with specific spacing therebetween and which has a plurality of inwardly directed projections on its inner wall surface, wherein the drum or the cylinder rotates about its axis so that shearing of the starting materials occurs between the projections of the drum and the projections of the cylinder.

Because the starting materials fed by means of a pump or the like is continuously charged, stirred, mixed and extruded by the process of the present invention, the extruded material can be continuously transferred to a molding step. Thus, the residence time of the surimi in this process is short, and therefore reduction in the ability of the mixture to form gel due to premature network formation can be prevented.

Because a stirring/mixing machine having a plurality of projections and a rotating drum or cylinder is used in the present invention, the degree of shearing is higher than that of the prior art stirring/mixing machine, Silent Cutter, or the like under the same processing time. Accordingly, the starting materials used can be prepared in an undivided or divided manner; the stirring process can be carried out within a short period of time; the denaturation of fish flesh proteins during processing can be further reduced; and the ability of the mixture to form a gel can be retained at a high level.

BRIEF DESCRIPTION OF DRAWINGS

In the accompanying drawings:

FIG. 3 is a side elevation, in longitudinal section, showing another example of a stirring/mixing machine which can be used in the process of the present invention; and FIG. 4 is a side view, in vertical section, showing a further example of a stirring/mixing machine.

BEST MODE OF CARRYING OUT THE INVENTION

Preparation of Starting Material

Figure 1:
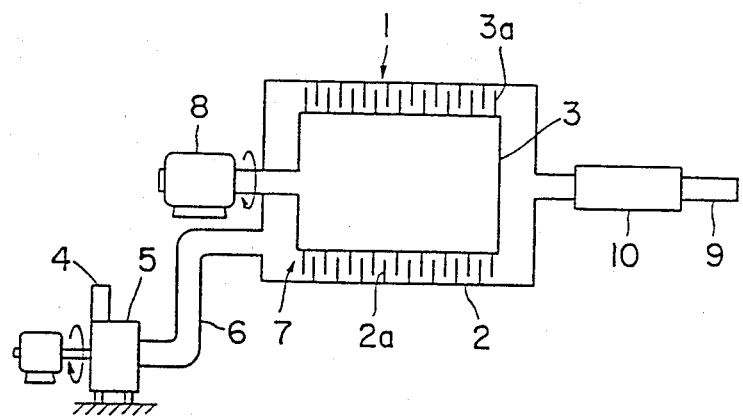
FIG. 1 is a schematic side view indicating the principle of a stirring/mixing machine which can be used in the process of the present invention.

A starting material used in the present invention is based on surimi. The kind of fishes which can be used in the present invention is not limited, and various fishes are suitable for use therein. Examples of such fishes include Theragra chalcogramma (an Alaska pollack);

Katsuwonus pelamis (an aku, barrilete, oceanic bonito, skipjack, stripped tuna, and bonito); Scomber japonicus (common mackerel); Seriola quinqueradiata (yellowtail and pilot fish); Sardinops sayax melanosticta (sardine); Lateolabrax japonicus (perch, Japanese perch-sea-wolf, bass, and ruff); Clupanodon punctatus (gizzard shad); lizard fish; croaker; Exocoetus volitans (flying fish); round scad; Pagrus major (porgy and red sea-bream); grouper; Paralichthys olivaceus (flatfish, fluke, flounder, halibut, plaice, turbot and sole); Stephanolepis cirrhifer (file fishes and leather-fish); Kareus bicoloratus; and flat head flounder. The fish surimi is prepared by debonding the fish flesh described above and washing it with water in a conventional manner. Fresh fish surimi and frozen fish surimi are preferred.

In addition to fish flesh surimi, examples of the starting materials from which the fish-paste product is produced include auxiliary materials such as salt, seasonings, toughening agents, perfumes, coloring agents, and water. Other foods such as vegetables can be used depending upon the kind of the fish-paste product. Examples of the toughening agents referred to herein include starch, soybean protein, and wheat protein. Examples of the seasonings herein include sodium glutamate and mirin (a sweet sake).

In the present invention, starting materials such as fish flesh surimi and auxiliary materials are prepared in order to feed them to the succeeding stirring/mixing step. The preliminary steps can be the same as various processes used in the conventional processes. Examples of the preliminary steps include washing, cutting and crushing. In the case of frozen products, examples of the preliminary steps include treatment such as thawing and mixing. Such preliminary steps can be suitably combined depending upon the conditions.

In the present invention, the blend proportions of the starting materials such as fish surimi can be suitably varied depending upon the kind of the desired fish-paste product and the like. However, in such preliminary steps, it is preferable that the denaturation of the starting material fish flesh be minimized. Particularly, in order to avoid or minimize the elution of actomyosin from fish flesh protein, it is desirable that no salt be added under the mixing conditions of the preliminary stage and that salt be charged directly into the mixing machine from a separate charging inlet. Further, the treatment steps are carried out at a temperature of 10° C. or below in order to prevent denaturation of fish flesh due to temperature increase.

Stirring/Mixing

In the present invention, the starting materials prepared in the preliminary steps are charged into a stirring/mixing machine having the following features in this step for stirring and mixing. Charging of the starting materials into the stirring/mixing machine may be carried out in an undivided manner. Alternatively, this may be carried out in a divided manner from a plurality of charging inlets.

In the stirring/mixing machines used in the present invention, the starting materials can be continuously fed; the starting materials can be stirred and mixed so that shearing of the starting materials amply occurs in the machines, and the treated materials can be continuously extruded from the stirring/mixing machines. A preferred stirring/mixing machine is one which has the ability to carry out sufficient shearing, and by which the starting materials can be treated for a short period of time. In the stirring/mixing machine used in the present invention, the starting materials need not be subjected to heat and excessive pressure in the machine, the pressure required for extruding the treated materials from the machine being enough.

This stirring/mixing machine used in a preferred embodiment of the present invention comprises a drum having a plurality of outwardly directed projections at the outer periphery thereof, and a coaxial cylinder which covers the outer periphery of the drum and its projections with a specific spacing therebetween, and which has a plurality of inwardly directed projections on its inner wall surface, wherein the drum or the cylinder can rotate about its axis so that shearing of the starting material occurs between the projections of the drum and the projections of the cylinder, i.e., at a mixing head, and wherein the starting materials can be continuously charged and extruded by means of a pump or the like.

At the mixing head of this apparatus, the projections of the drum or the projections of the cylinder rotate and therefore the stirring/mixing capacity is high. Thus, it is possible to carry out this step within a short period of time.

The rotational speed of the drum used in this step is from 100 to 1,000 r.p.m., and the stirring/mixing time is from 25 minutes to several seconds. If the rotational speed is less than 100 r.p.m., the gel strength will not increase. If the rotational speed is more than 1,000 r.p.m., the treatment time of stirring/mixing will become very short; the control will be difficult; and the surimi cannot be sufficiently stirred/mixed. The preferred rotational speed is from 150 to 800 r.p.m., and the preferred stirring/mixing time is from 15 minutes to 15 seconds.

Referring to FIG. 1 which is a schematic view indicating the principle of a stirring/mixing machine used in a preferred example of the present invention, the mixer will now be described in detail.

Figure 2:
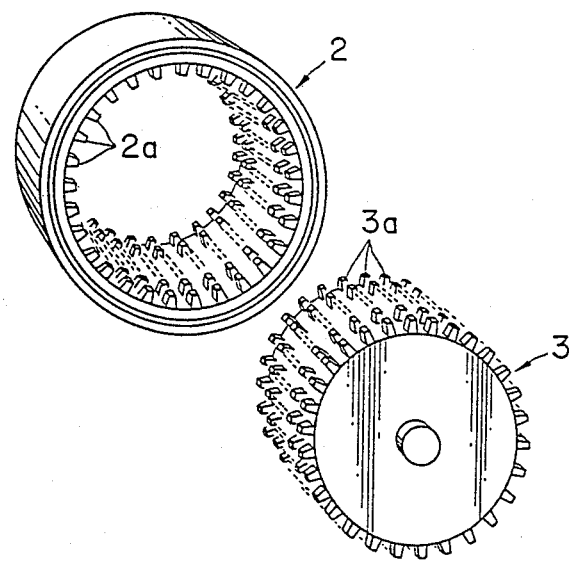
FIG. 2 is an exploded perspective view of the cylinder and drum of the stirring/mixing machine shown in FIG. 1.

This mixer 1 comprises a fixed cylinder 2 and a rotating drum 3. The inner wall surface of the cylinder 2 is provided with a plurality of inwardly directed teeth (projections) 2a. The outer periphery of the drum 3 is provided with a plurality of outwardly directed teeth (projections) 3a. An example of the cylinder 2 and the drum 3 is shown in FIG. 2, which is an exploded perspective view of the mixer. Also, in this example, the teeth of the drum and the teeth of cylinder are alternately provided at their peripheries so that they will not collide when the drum 3 rotates.

This mixer is used in the following manner in the practice of the process of this invention. The starting materials prepared in the preliminary steps are fed through a conduit 4 to a transfer pump 5, and charged by means of the transfer pump 5 into a mixing head 7 of the mixer 1 via a conduit 6. The drum 3 of the mixer 1 in use is rotated at a specific speed by a motor 8. The starting materials conveyed to the mixing head 7 are effectively sheared between the teeth of the cylinder and the teeth of the drum. When the starting materials are passed through these teeth, the starting materials are not only disintegrated into extremely fine fragments but are also uniformly dispersed and mixed. Ordinarily, the starting materials at the mixing head are under a pressurized state due to the delivery pressure of the transfer pump 5. The starting materials thus charged by this pressure are forced to pass through the mixer 1 and taken out from an extrusion orifice 9 after their discharge rate has been regulated by a discharge regulation valve 10. However, the present invention is not limited to only this example. For example, the shape of the teeth may be suitably varied so that the starting materials will be caused to travel toward the extrusion orifice 9 by the rotation of the teeth.

In addition to the above described method of using the mixer, the prepared starting materials can also be separately charged into the mixing head.

It is preferable that the operation conditions such as rotational speed, treatment time, and treatment temperature of the mixer described above be suitably varied depending upon the kind, characteristic and composition of the starting material and the kind of the desired fish-paste product.

The stirring/mixing machine which can be used in the present invention is not limited to the example described above. A variant shown in FIG. 3(a) can be used in the present invention. A horizontal apparatus of this example principally comprises a horizontally elongate cylindrical casing 31 for forming a cylindrical mixing chamber 30; a starting material-charging hopper 32 for communicating with the upper portion of one end of this casing 31; an extrusion orifice 33 provided at the other end of the casing 31; an extrusion screw 34 provided at the upstream side of the interior of the mixing chamber wherein the extrusion screw 34 is coaxial with the casing cylinder 31; a plurality of spaced-apart bulkheads 35', 35" and 35'" which are provided at the downstream side of the interior of the mixing chamber 30, each bulkhead having a plurality of die orifices 36 (the bulkheads being sequentially provided with specific spacing from the upstream side to the downstream side), rotating blades 37', 37" and 37'" provided at the upstream side in the vicinity of the bulkheads wherein the rotating blades 37', 37" and 37'" are coaxial with the extrusion screw 34; and coaxial stirring/rotating blades 38 provided between bulkheads. In this stirring/mixing machine, the bulkhead 35 is provided with a plurality of die orifices 36 as shown in FIG. 3(b), which is a sectional view of the bulkhead. The rotating blade 37 comprises four blades as shown in FIG. 3(c).

The control and operation of this apparatus will now be described. First, a starting material-feeding screw 39 is rotated by means of a prime mover (not shown); and the extrusion screw 34, the rotating blades 37 and the stirring/mixing blades 38 are driven in rotation by means of a motor 40. The starting materials are then fed into the starting material-charging hopper 32. The starting materials are charged into the upstream interior of the mixing chamber 30 by the starting material-feeding screw 39. The starting materials are forced toward the downstream side by the rotating extrusion screw 34. As the starting materials flowing to the downstream side are stirred and mixed by the rotating blades 37 and the stirring/rotating blades 38, and as the starting materials are extruded from the dies 36 of the bulkheads 35, they undergo shear action. The materials stirred and mixed by the extrusion pressure are finally extruded through the extrusion orifice 33. In order to avoid temperature rise due to heat generation during the mixing process, cooling water can be caused to flow along the outer peripheral surface of the casing 31 from a cooling water inlet 42 and discharged through a cooling water outlet 41.

A further modification of the stirring/mixing machine which can be used in the process of the present invention is shown in FIG. 4(a). This example is a vertical apparatus, and comprises principally a cylindrical casing 45 for forming a mixing chamber 44; a rotating shaft 46 vertically provided along the axis of the casing 45; a starting material-feeding tube 47 communicating with the upper end of the mixing chamber 44; an extrusion tube 48 communicating with the lower end of the mixing chamber 44; a number of fixed pins 49 provided so that they project inward from the inner wall surface of the casing 45; rotating pins 50 which project outward from the rotating shaft 46 toward interstices between the fixed pins 49; and rotating blades 51 provided at the upper end of the rotating shaft 46, wherein the rotating blades 51 are disposed in the upper portion of the mixing chamber 44. In this stirring/mixing machine, two assemblies each of four rotating blades 51 are used as shown in FIG. 4(b).

The control and operation of this stirring/mixing machine are as follows. First, a gear pump 52 provided in the starting material-feeding tube is driven by a motor 53, which drives the rotating shaft 46. The starting materials are then fed into the upper portion of the mixing chamber 44 via the starting material-feeding tube 47 by the gear pump 52. The starting materials are stirred in the mixing chamber 44 by the rotating blades 51 and flow to the downstream side by pressure applied by the gear pump 52 and by gravity. The stirred materials are further stirred and mixed between the fixed pins 49 and the rotating pins 50, and thus they undergo necessary shearing. The materials further flowing to the downstream side are extruded through the extrusion tube 48. In order to avoid temperature rise due to heat generation during the stirring/mixing process, cooling water can be caused to flow along the outer peripheral surface of the casing 45 via a cooling water inlet 54 and a cooling water outlet 55 to cool the interior of the mixing chamber.

Molding and Heating

In the present invention, the salted surimi extruded from the stirring/mixing machine described above is formed into a specific shape. In the present invention, it is desirable that this molding be carried out immediately without allowing the salted surimi being continuously extruded to stand in order to minimize the denaturation of fish flesh protein. The molding methods can be suitably varied depending upon the kind of the fish-paste product. The molding methods used may be conventional methods.

The salted surimi formed into a specific shape is then heated. Methods for heating it can be suitably selected depending upon the kind of fish-paste product. Examples of heating methods usable in the present invention include steaming, baking, frying with oil, and boiling. In order to increase the gel strength, the molded fish flesh may be heated after heating for premature network formation. Heating for premature network formation is usually carried out overnight at a temperature of 5° to 10° C. or for 10~60 minutes at a temperature of 30° to 60° C. Heating is carried out for about 20~60 minutes at a temperature of from 80° to 98° C. so that the center temperature of the fish-paste product is 70° C. or above.

EXAMPLES

This invention will now be described more fully by way of specific examples.

EXAMPLE 1

One hundred parts of Alaska pollack surimi thawed and crushed into a size of the order of 5 mm, 3.5 parts of salt, 5 parts of starch, 7 parts of mirin (a sweet sake), 5 parts of seasoning, and 55 parts of water were charged into a kneader and kneaded as pretreatment to prepare a starting material.

The resulting starting material was immediately charged into a stirring/mixing machine as illustrated in FIGS. 1 and 2 by means of a transfer pump. Stirring/mixing was carried out in a continuous treatment manner at a rotational speed of 300 r.p.m. for a treatment time of 7 minutes (the treatment time was taken from charging to discharging).

The resulting salted surimi was formed into a kamaboko or fish cake shape. Heating for premature network formation was carried out for 40 minutes at a temperature of 35° C., and heating was then carried out for 40 minutes at a temperature of 85° C. The fish cake produced had a so-called rubbery texture, and its gel strength was 1,100 grams.

EXAMPLE 2

One hundred parts of Alaska pollack surimi crushed into a size of the order of 5 mm, 5 parts of starch, 1 part of mirin (a sweet sake), 5 parts of seasoning, and 55 parts of water were charged into a kneader and kneaded for about one minute as pretreatment.

A saline solution consisting of 10 parts of water and 3.5 parts of salt was charged from an auxiliary charging part provided at the stirring head of the same stirring/mixing machine as described in Example 1, in an amount of one part per 10 parts of the mixed surimi described above by using a transfer pump. The charged material was subjected to continuous treatment at a rotational speed of 300 r.p.m. for a treatment time of 7 minutes (the treatment time was from charging to discharging).

The resulting salted surimi was formed into a specific shape. Heating for premature network formation was carried out for 60 minutes at a temperature of 35° C., and then steam heating was carried out for 40 minutes at a temperature of 85° C. The fish cake produced had a so-called rubbery texture, and its gel strength was 900 grams.

EXAMPLE 3

One hundred parts of Alaska pollack surimi thawed and crushed into a size of the order of 5 mm, 15 parts of starch, 5 parts of mirin (a sweet sake), 5 parts of seasoning, 20 parts of water, and 3.5 parts of salt were kneaded in a kneader as pretreatment.

The resulting mixture was charged into the stirring apparatus described in Example 1 by means of a transfer pump. Treatment was carried out for five minutes at a rotational speed of 300 r.p.m.

The resulting fish flesh surimi as a molding material was mixed with finely cut vegetables. The mixture was molded and fried in oil to produce fried fish balls. The gel strength of the fried fish balls was 400 grams.

COMPARATIVE EXAMPLE

A kamaboko or fish cake was produced as described in Example 1 except that: a Silent Cutter was used as the stirring/mixing machine; 3.5 parts of salt were added to 100 parts of thawed and crushed Alaska pollack surimi; mincing was carried out in the presence of common salt; and thereafter 5 parts of starch, 1 part of mirin (a sweet sake), 5 parts of seasoning and 55 parts of water were added and mixed in a conventional manner. The gel strength of this fish cake was 750 grams.

What is claimed is:

1. In the process for producing a fish-paste product comprising stirring and mixing a starting material comprising a minced fish flesh or surimi by means of a stirring-mixing machine, forming the resulting minced flesh or surimi into a specific shape, and then heating the thus formed minced flesh or surimi, the improvement comprising continuously charging said starting material into said stirring-mixing machine, stirring and mixing the starting material so that shearing of the starting material occurs, and continuously extruding the shearing material from said stirring-mixing machine,
   wherein the stirring-mixing machine comprises a rotating body having a plurality of outwardly directed projections at an outer periphery thereof and a coaxial cylinder which covers the outer periphery of said rotating body and said projections with a specific spacing provided therebetween, which cylinder has a plurality of inwardly directed projections on its inner wall surface, wherein said rotating body or said cylinder rotates about its axis so that shearing of said starting material occurs between the projections on said rotating body and the projections of said cylinder.

2. The process of claim 1, wherein the rotating body is a drum.

* * * * *